(12) United States Patent
Casper et al.

(10) Patent No.: US 7,685,060 B2
(45) Date of Patent: Mar. 23, 2010

(54) SYSTEM AND METHOD FOR MANAGING FINANCIAL ACCOUNT INFORMATION

(75) Inventors: Robert Casper, New York, NY (US); Jeffrey McMillan, New York, NY (US)

(73) Assignee: Morgan Stanley, New York, NY (US)

( * ) Notice: Subject to any disclaimer, the term of this patent is extended or adjusted under 35 U.S.C. 154(b) by 1497 days.

(21) Appl. No.: 09/785,596

(22) Filed: Feb. 16, 2001

(65) Prior Publication Data
US 2002/0116304 A1    Aug. 22, 2002

(51) Int. Cl.
*G06Q 40/00* (2006.01)
(52) U.S. Cl. .................... 705/38; 705/7; 705/10
(58) Field of Classification Search .......... 707/1, 707/100; 705/7, 10, 35, 36 R, 38
See application file for complete search history.

(56) References Cited

U.S. PATENT DOCUMENTS

| | | | | |
|---|---|---|---|---|
| 5,649,116 | A * | 7/1997 | McCoy et al. ............. | 705/38 |
| 5,819,263 | A * | 10/1998 | Bromley et al. ........... | 707/3 |
| 5,953,710 | A * | 9/1999 | Fleming .................. | 705/38 |
| 5,978,779 | A * | 11/1999 | Stein et al. .............. | 705/37 |
| 6,026,382 | A * | 2/2000 | Kalthoff ................. | 705/35 |
| 6,058,375 | A | 5/2000 | Park ...................... | 705/30 |
| 6,119,103 | A | 9/2000 | Basch et al. ............. | 705/35 |
| 6,128,602 | A | 10/2000 | Northington et al. ...... | 705/35 |
| 6,327,573 | B1 * | 12/2001 | Walker et al. ............ | 705/14 |

(Continued)

FOREIGN PATENT DOCUMENTS

| | | |
|---|---|---|
| JP | 11-053450 | 2/1999 |
| JP | P2003-526823 | 9/2003 |
| WO | WO 99/27477 A1 | 6/1999 |

OTHER PUBLICATIONS

Prague, Cary N., and Michael R. Irwin. Access 97 Bible. 1997. pp. 54-56.*
Kroenke, "Database Processing", Japan, Toppan Co., Ltd., First Edition, pp. 190-193 (Aug. 30, 1996).
Japanese Office Action issued for Patent Application JP, 2002-566891 on Oct. 16, 2007.
Int'l Search Report dated Sep. 18, 2002 for PCT/US02/01448.

*Primary Examiner*—Hani Kazimi
*Assistant Examiner*—Daniel Kesack
(74) *Attorney, Agent, or Firm*—Isabel Cantallops; Baker & Hostetler LLP

(57) ABSTRACT

A system is provided that includes a party file having a plurality of party records with each of the plurality of party records having party information relating to one of a plurality of parties. Also included is an account file having a plurality of account records with each of the plurality of account records having account information relating to one of a plurality of accounts. Each of the plurality of account records also includes a link to at least one of the plurality of party records. Finally, a transaction file is included having a plurality of transaction records with each of the plurality of transaction records having transaction information relating to one of a plurality of transactions. Each of the plurality of transaction records includes a link to one of the plurality of account records.

49 Claims, 11 Drawing Sheets

U.S. PATENT DOCUMENTS

| | | |
|---|---|---|
| 6,349,291 B1 | 2/2002 | Varma .................. 705/35 |
| 6,460,027 B1 * | 10/2002 | Cochrane et al. ............ 707/2 |
| 6,636,833 B1 | 10/2003 | Flitcroft et al. |
| 7,356,497 B1 * | 4/2008 | Bursey et al. ............ 705/36 R |
| 2002/0046053 A1 | 4/2002 | Hare et al. .................. 705/1 |
| 2002/0049655 A1 | 4/2002 | Bennett et al. ............ 705/35 |
| 2002/0049749 A1 | 4/2002 | Helgeson et al. ........... 707/3 |
| 2002/0062270 A1 | 5/2002 | Star ........................ 705/36 |

\* cited by examiner

| Account | Party |

Action Requested
- ◉ Search by Number
- ○ Search by Facts
- ◉ Request New Account

Action Value
Please complete some or all of below account facts

Work Flow
Phase
Task

Account System
Account Number
Account Status
Account Purpose

Comments
Back — Next
Cancel All

Product(s) & Agreement

| General Product | Specific Product | Operative Agreement |
|---|---|---|
| OTC Fixed Income Derivatives | Interest Rates Swaps | Master Agreement |
|  |  |  |

Roles & Parties 75 73 — 72

| Core Roles | Alias | Full Name | Address | Org. Unit |
|---|---|---|---|---|
| ORDER PLACER(S) |  |  |  |  |
| PRINCIPAL(S) |  |  |  |  |
| SALES COVERAGE |  |  |  |  |
| BOOKING COMPANY |  |  |  |  |
| Other Roles |  |  |  |  |
|  |  |  |  |  |
|  |  |  |  |  |

(MAKE FAVORITE ACCOUNT) (ACCOUNT) (EDIT ACCOUNT) (SAVE IN PROGRESS)

SYSTEM AND METHOD FOR MANAGING FINANCIAL ACCOUNT INFORMATION

BACKGROUND

The following invention relates to financial accounts and, in particular, to a system and method for managing financial account information.

One of the services provided by financial institutions is engaging in transactions with or on behalf of its clients. For example, if a client wants to purchase 100 shares of a particular stock, the financial institution will make the purchase on behalf of the client and charge the client's account the purchase price of the security involved plus a commission fee. The fees earned as a result of performing these transactions represent a significant portion of the financial institution's revenues. Additionally, the information associated with these accounts, when aggregated across the financial institution, becomes a key source for management decisions in the areas of risk management, customer service, marketing and operations processing.

Establishing a successful transactional business requires that the client account information be properly managed. The process of managing client account information typically includes filling out a new account form for each client account opened which requests information such as the client's name, address, legal status, advisors that are authorized to place orders on behalf of the client, the sales person managing the account and the names of any guarantors of transactions executed in that account. In addition, client account information may also include the client's preferences such as settlement instructions, tax withholding information and where to send statements, confirmations and other correspondence. Once the client information is gathered, it is typically entered into a computerized client account management system.

Also, associated with each client account is a list of all the transactions or positions the particular client has engaged in or with through the financial institution. So, for example, if the client purchased 100 shares of XYZ Corp., the details of that transaction, such as the transaction date, instrument type, quantity, price and commission will be stored in a transaction database and associated with the particular client account. In this way, the financial institution can use the client account and transaction information stored in the client account management system to track and manage its transactional business.

A benefit of a client account management system is that it allows the financial institution to assess its exposure with respect to a particular transaction or series of transactions. For instance, if the financial institution learns that one of its clients, Acme Corp., is having liquidity problems, then the client account management system can be queried to identify all the transactions the financial institution engaged with or on behalf of Acme Corp. Based on this information, the financial institution can make a business decision as to (a) whether Acme Corp. has sufficient assets to cover any losses incurred, and (b) whether the trading limit of Acme Corp. should be reduced to limit the risk to the financial institution. Thus, the client account management system plays a key role in helping the financial institution manage the risks associated with each client's transactions.

Another benefit of the client management account system is that it helps the financial institution analyze the profitability of its transactional business and also identify new areas of business opportunity. By tracking all the transactions involving each client, the firm can determine which clients are the most profitable, which transactions are successful and what areas of business should be pursued to increase the financial institution's overall profitability.

Although an effective client account management system is central to operating a profitable transaction business, the prior art client account management systems are unable to provide a financial institution with the reliable, maintainable and easily accessible information it needs to help assess the risk and determine the profitability of its sales and trading businesses. The ineffectiveness of the prior art client account management systems is the result of a number of factors.

First, the prior art systems are generally poor at enforcing and maintaining data integrity. For example, assume Acme Corp. wants to open up three different accounts with a financial institution (Acme Corp. may have numerous accounts with the same financial institution because, for example, it wants to segregate transactions involving different investment instruments into different accounts). In the prior art systems, this generally required that Acme Corp.'s company information be entered into the system three separate times— one time for each new account opened. Because of the multiple data entries, the company information that is actually entered each time may vary slightly due to error or inconsistent punctuation and abbreviations. For instance, one account entry may use the name Acme Corp. while another entry may use Acme Co. A prior art account management system was analyzed and it was found that, due to inconsistent punctuation and abbreviations of the name of a particular client that had over 600 accounts entered into the system, the system maintained over thirty unique spellings for the client's name. If the spelling for each account associated with a particular client is different, the system is unable to determine which accounts are related to a particular client. As a result, the system would be unable to identify all the transactions performed by the particular client through its related accounts, a step that is necessary to assess properly the risk and profitability resulting from each client's transactions.

Another drawback of the prior art client account management systems is the inability of these systems to manage effectively multiple accounts of different but related entities. Often, a client uses several accounts in which to transact business, with each account being associated with a different legal entity related to the client such as, for example, a subsidiary or a parent. Although the name that appears on each account is different, the risk associated with those related accounts may correlate to the creditworthiness of the client family (i.e., ultimate parent). Therefore, for the purposes of risk management, it would be beneficial if all the transactions executed under the different accounts associated with the particular client could be aggregated to determine the total exposure to that client. The prior art systems, however, cannot easily manage the hierarchies of related accounts and relationships among accounts associated with a given client and, as a result, these systems cannot readily identify related transactions for the purpose of risk management.

Another deficiency of the prior art systems is the lack of precision in identifying the roles the various legal entities play in a particular client account. For example, associated with a given account are various legal entities such as the actual principal (or beneficial owner, for e.g., the XYZ Fund), the order placer for the principal (e.g., the XYZ Management Co.), the legal entity of the financial institution that will transact on behalf of the client, the salesperson managing the client account and, if required, the entity acting as a guarantor of the client's transactions. What typically occurs in the prior art systems is that although the data entry person may enter into the client account record the names of these related entities, the system does not automatically tag these entities in a manner that identifies their relationship with the client and the role they play. So, for example, if ABC Corp. is acting as the guarantor of Acme Corp. transactions, ABC Corp.'s name may be entered into the Acme Corp. account record by the data entry person but the system does not necessarily recognize that ABC Corp. is a guarantor of Acme Corp. for risk management purposes. As a result, when a risk analysis of Bob Smith's own transactions are performed, the system won't include in the risk calculation the exposure stemming from ABC Corp.'s guarantee of Acme Corp's transactions.

In summary, because the prior art client account management systems do not manage client account information and account relationships effectively, the client account and transaction information cannot be easily leveraged to help manage the risk and assess the profitability of the financial institution's sales and trading businesses.

SUMMARY OF THE INVENTION

The present invention is directed to a system and method for overcoming the deficiencies of the prior art. According to the present invention a system is provided that includes a party (i.e., legal entity) file having a plurality of party records with each of the plurality of party records having party information relating to one of a plurality of parties. Also included is an account file having a plurality of account records with each of the plurality of account records having account information relating to one of a plurality of accounts. Each of the plurality of account records also includes a link to at least one of the plurality of party records. Finally, a transaction file is included having a plurality of transaction records with each of the plurality of transaction records having transaction information relating to one of a plurality of transactions. Each of the plurality of transaction records includes a link to one of the plurality of account records.

In an exemplary embodiment of the present invention, the plurality of parties includes at least one principal party and each of the plurality of account records includes a link to one of the plurality of party records having information relating to the at least one principal party.

In an exemplary embodiment of the present invention, the plurality of parties includes at least one order placer party and each of the plurality of account records includes a link to one of said plurality of party records having information relating to the at least one order placer party.

In an exemplary embodiment of the present invention, the plurality of parties includes at least one salesperson party and each of the plurality of account records includes a link to one of the plurality of party records having information relating to the at least one salesperson party.

In an exemplary embodiment of the present invention, the plurality of parties includes at least one booking company party and each of the plurality of account records includes a link to one of the plurality of party records having information relating to the at least one booking company party.

In an exemplary embodiment of the present invention, the plurality of parties includes at least one guarantor party and each of the plurality of account records includes a link to one of the plurality of party records having information relating to the at least one guarantor party.

In an exemplary embodiment of the present invention, each of the plurality of party records have a hierarchical relationship field. A first of the plurality of party records stores party information relating to a first party and a second of the plurality of party records stores party information relating to a second party wherein the first party and the second party have a hierarchical relationship. The hierarchy relationship field of the first of the plurality of party records and the hierarchical relationship field of the second of the plurality of party records indicate the hierarchical relationship between the first party and the second party.

In an exemplary embodiment of the present invention, each of the plurality of party records have a party relationship field. A first of the plurality of party records stores party information relating to a first party and a second of the plurality of party records stores party information relating to a second party, the first party and the second party have a party relationship. The party relationship field of the first of the plurality of party records and the party relationship field of the second of the plurality of party records indicate the party relationship between the first party and the second party. In an exemplary embodiment, the party relationship between the first party and the second party is a guarantor-guarantee relationship.

In an exemplary embodiment, a method of determining the risk associated with a plurality of transactions associated with one party of a plurality of parties is provided. First, the parties related to the one party is identified. Next, those account records in which the one party or the related parties is a principal is retrieved from the account file. Next all transaction records that are linked to those account records are identified. Finally, an aggregate risk exposure for all transactions of the identified transaction records may be determined by a risk management system.

In an exemplary embodiment, the method of determining the risk resulting from a plurality of transactions associated with the one party further includes the step of identifying all guarantors associated with the retrieved account records. Next, all guarantors of the one party are identified and a total guarantee amount is determined. Finally, the aggregate risk exposure is evaluated in view of the total guarantee amount.

In an exemplary embodiment of the method of determining the risk associated with a plurality of transactions associated with one party, the parties related to the one party are identified via the hierarchical relationship field.

In an exemplary embodiment of the method of determining the risk associated with a plurality of transactions associated with one party, the guarantors of the one party are identified via the party relationship field.

Using the system of the present invention, the financial institution can manage client account information by creating party hierarchies (i.e., relationships between multiple legal entities) for different purposes such as credit, legal and marketing with each of these purposes using a differing grouping of parties. As such, the present invention accommodates this need by allowing the linkage of parties to other parties for many defined purposes. The financial institution may then use the system to manage risk by locating all parties linked together in a certain hierarchy for "legal purposes" or "credit purposes," selecting the role of interest such as principal or principal's guarantor, and then retrieving all accounts in which those parties are playing that role. The transactions in those accounts are then identified for the purposes of measuring exposure to risk. The financial institution may also use the system to identify marketing opportunities by locating all parties linked together in a certain hierarchy for "marketing purposes," selecting the role of interest such as order placer, and then retrieving all accounts in which those parties are playing that role.

Thus, the present invention provides a system and method for managing client account information and account relationships effectively so that such information can be used to help manage the risk and assess the profitability of a financial institution's sales and trading businesses.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 7 is a screen shot of an account record entry screen in accordance with an exemplary embodiment of the present invention;

DESCRIPTION OF PREFERRED EMBODIMENTS

Figure 1:
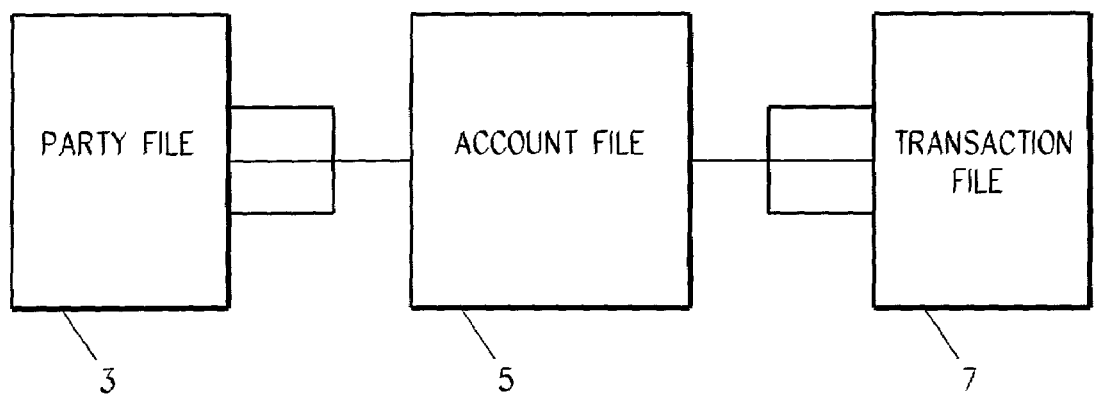
FIG. 1 is a block diagram of a party file, account file and transaction file data structure of the present invention.

Central to the client account management system of the present invention is the concept of an "account." An account is a bucket into which a plurality of related transactions are placed. Each account has associated therewith a number of parties each of which plays a role in that account. For example, each account has a party that plays the role of a principal, i.e., the beneficial owner of the account. Another party associated with each account is an order placer—the party that is authorized by the principal of the account to initiate transactions in the account. Other types of parties that may be associated with an account include, but are not limited to, a booking company (i.e., the entity associated with the financial institution that transacts with the order placer), an account salesperson and a guarantor. Thus, each account includes a particular set of parties that have defined roles with respect to that account.

If a client desires to enter into transactions using a combination of parties, the system first searches existing accounts to determine whether the desired combination of parties occurs in any of the existing accounts or whether the combination of parties is unique. If the desired combination of parties does occur in an existing account, then that account is used for the transactions. If the desired combination of parties is unique, then a new account is established for that set of parties. For example, assume a client has an existing account No. 0001 that includes Principal Acme, Order Placer ABC Investment Advisors, Booking Company DEF & Co. and Salesperson Bob. If the client would like to also transact business with Salesperson Ted, then a new account No. 0002 would be created that has as parties Principal Acme, Order Placer ABC Investment Advisors, Booking Company DEF & Co. and Salesperson Ted. By creating a new account for this set of parties, the system is able to track separately the performance of Salesperson Bob and Salesperson Ted with respect to transactions involving Principal Acme. A new account is also created if a different operative agreement governs the transaction so that trades can be properly grouped via account into netting buckets. In general, a new account is created whenever a transaction occurs that has associated therewith a unique combination of principal, order placer, salesperson booking company and operating agreement.

Each account has linked to it the transactions performed under that account. So, for example, if Order Placer ABC Investment Advisors placed an order with Salesperson Bob to buy 100 shares of IBM for Principal Acme of Account No. 0001, that transaction is linked to Account No. 0001. By organizing accounts and transactions in this manner, the system is able to associate such transactions with the particular set of parties linked to that account. This party-transaction relationship allows the system of the present invention to perform various analyses such as determining the risk exposure per principal, profitability per salesperson as well as numerous others calculations.

To achieve these benefits, the client account management system of the present invention employs the data architecture shown in FIG. 1. According to the invention, client data is partitioned into three data files: a party file 3, an account file 5 and a transaction file 7.

Figure 2:
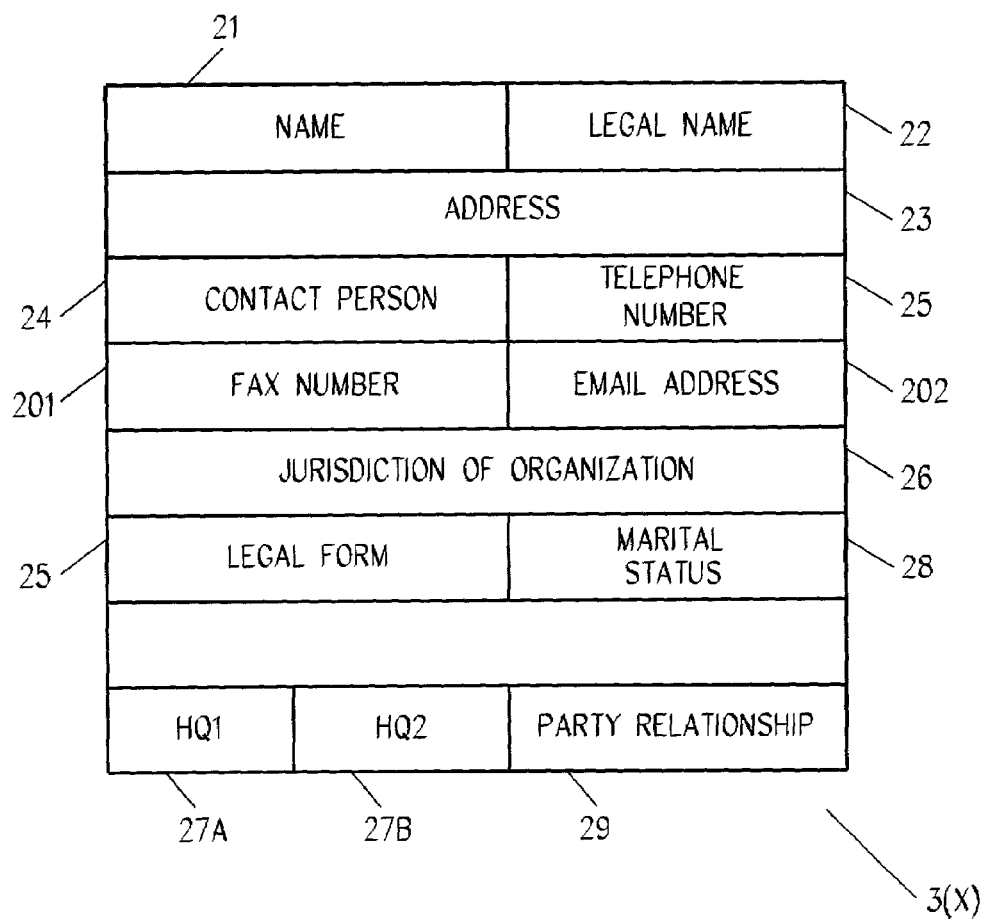
FIG. 2 is a block diagram showing the format of a party record of the party file of FIG. 1.
Figure 3B:
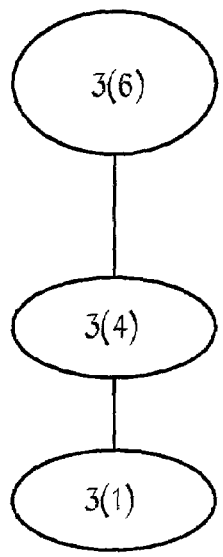
FIG. 3B is a block diagram of the hierarchical relationship of FIG. 3A.
Figure 3A:
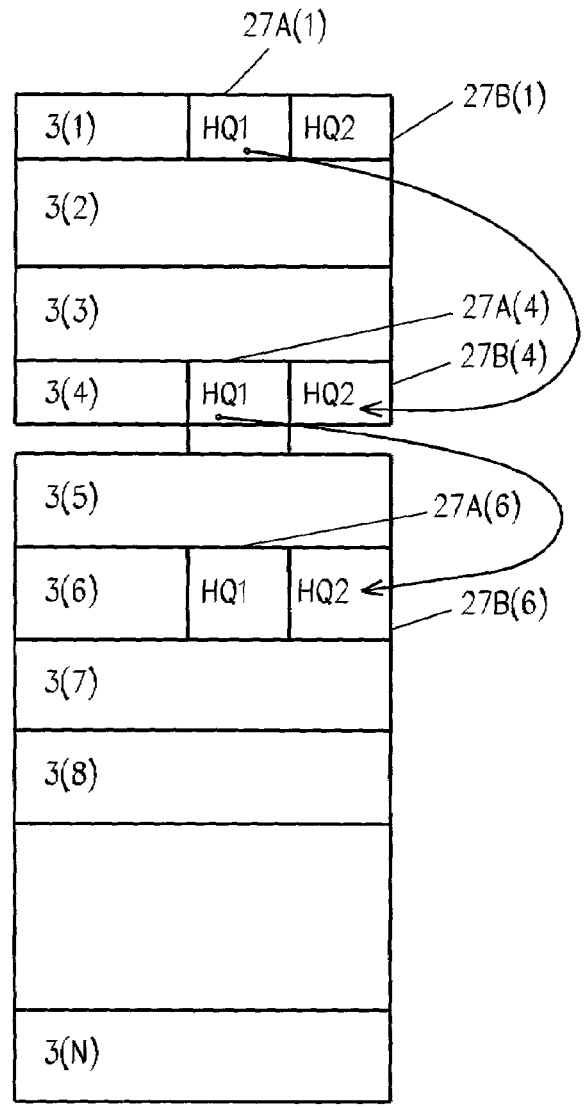
FIG. 3A is a block diagram of the party file of FIG. 1 showing hierarchical relationships between party records.

Referring now to FIG. 2, there is shown a block diagram showing the format of a record in party file 3. Referring also to FIG. 3A, there is shown a block diagram of party file 3 that includes a plurality of records 3(1), 3(2) . . . 3(N) with each record 3(x) including fields for storing information about one party contained in the system. For example, each record 3(x) of party file 3 includes a field for the party's name 21, legal name 22, address 23, contact person 24, telephone number 25, FAX number 201, email address 202, legal form 25, marital status (if the party is an individual) 28, and jurisdiction of organization (if the party is a legal entity) 26. A person of ordinary skill in the art will recognize that, in addition to these fields, record 3(x) may include fields for any other information relating to a particular party that is desirable to maintain.

Some of the fields in record 3(x) may call for information that is not relevant for every party and therefore is not utilized for a particular party. For instance, if a particular party is a legal entity such as a corporation, then marital status field 28 has no relevance and is ignored for that particular record. In such a case, when data is being entered into a party record for that particular party, the system will not request data relating to the party's marital status. In addition, the values the system accepts for a particular field may depend on a value previously entered for a related field. For example, if Spain is the value selected for jurisdiction of organization field 26, then the possible values the system presents for legal form field 25 will be specific to Spain. In this way, party record 3(x) includes fields and the system presents possible values for such fields to accommodate a wide range of party types while still maintaining a streamlined data entry process.

Figure 4:
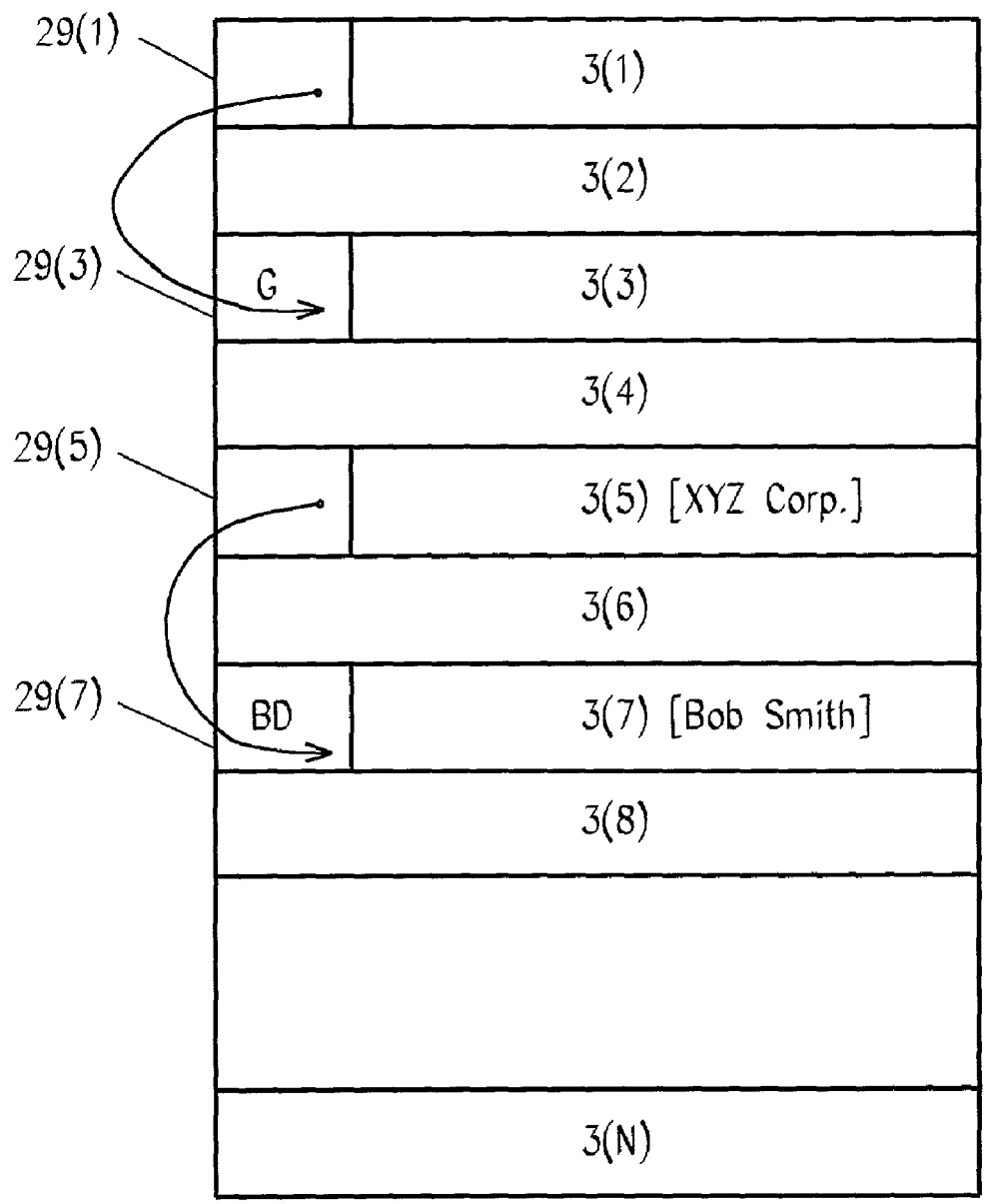
FIG. 4 is a block diagram of the party file of FIG. 1 showing party relationships between party records.

Referring now to FIG. 4, there is shown a block diagram of party file 3 showing relationships between particular party records 3(x). Each party record 3(x) also includes a party relationship field 29 that facilitates the creation of relationships between different parties stored in party file 3. For example, if XYZ Corp. is a party stored in party record 3(5) and Mr. Smith, a board member of XYZ Corp. is a party stored in party record 3(7), it is useful to identify Mr. Smith as a board member of XYZ Corp. so that his obligations with respect to buying/selling XYZ Corp. stock are not violated. To create such a relationship between XYZ Corp. and Mr. Smith, party relationship field 29(5) of party record 3(5) will contain a link, using known database programming techniques, to party record 3(7) identifying that party as a board member of the party contained in party record 3(5). Also, party relationship field 29(7) of party record 3(7) will contain a link to party record 3(5) identifying that party as a company that the party contained in party record 3(7) is a board member of.

In this way, party relationship field 29 can be used to establish links between parties in party file 3 to create any desired relationship between the parties. For example, if the party of party record 3(3) is a guarantor for all transactions performed by the party of party record 3(1), then the appropriate links will be stored in party relationship fields 29(3) and 29(1) to establish this guarantor-guarantee relationship. In a similar manner, any other desired party relationships may be established.

In addition to establishing party relationships as described above, party record 3 includes a hierarchical relationship field 27 for identifying parties that are related to each other in a hierarchical structure. Hierarchical relationship field 27 consists of an HQ1 field 27A and an HQ2 field 27B. Hierarchical relationship field 27 is used as follows. Assume the party of party record 3(6) is a corporation and that corporation owns a subsidiary corporation that is a party stored in party record 3(4). Assume further that the corporation of party record 3(4) owns a subsidiary corporation that is a party stored in party record 3(1). To identify that these three corporations are all related entities (which may not be apparent from the party names), a link is placed in HQ1 field 27A(l) of party record 3(1) pointing to HQ2 field 27B(4) of party record 3(4) that indicates that the party of party record 3(4) is the parent of the party of party record 3(1). Similarly, a link is placed in HQ1 field 27A(4) of party record 3(4) pointing to HQ2 field 27B(6) of party record 3(6) that indicates that the party of party record 3(6) is the parent of the party of party record 3(4). When the tree structure defined by the links stored in hierarchical relationship fields 27(1), 27(4) and 27(6) is traversed, the hierarchical relationship between the three corporations is determined, as shown in FIG. 3B. As will be shown later, determining the hierarchical relationship between parties is necessary to effectively perform risk management and profitability analysis.

Although the creation of party relationships and hierarchical relationships has been shown using links placed in party relationship field 29 and hierarchical relationship field 27, respectively, to create a tree structure to identify the desired relationships, it will be understood by one possessing ordinary skill in the art that any other technique to identify the party and hierarchical relationships between the parties may be used. Additionally, the system has the ability to maintain multiple hierarchies.

Figure 5:
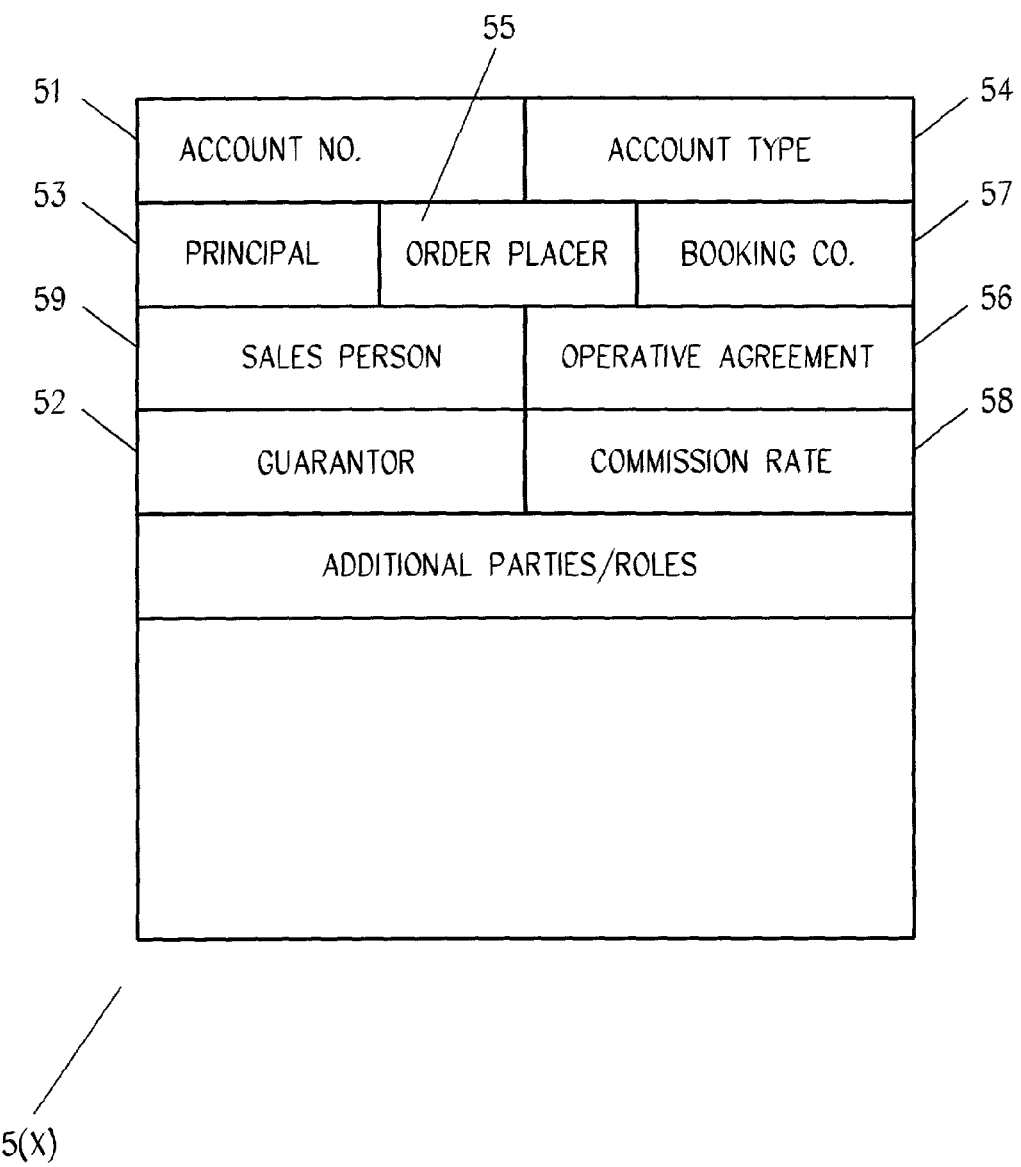
FIG. 5 is a block diagram showing the format of an account record of the account file of FIG. 1.

Referring now to FIG. 5, the format of account file 5 is shown. Account file 5 includes a plurality of records 5(1), 5(2) . . . 5(N) with each record 5(x) including fields for storing information about one account that is added to the system. For example, each account record 5(x) of account file 5 includes an account number field 51, an account type field 54 (e.g., cash or margin), a commission rate field 58, and an operative agreement field 56 that references the agreement that governs the client-financial institution relationship. In addition, each account record 5(x) includes a field that contains a link to parties that play a role in account 5(x), including a principal link field 53, an order placer link field 55, a booking company link field 57, a salesperson link field 59, and a guarantor link field 52. A person of ordinary skill in the art will recognize that, in addition to these fields, each record 5(x) may also include fields for links to additional parties having other roles as well as any other information relating to a particular account that is desirable to maintain.

Figure 6:
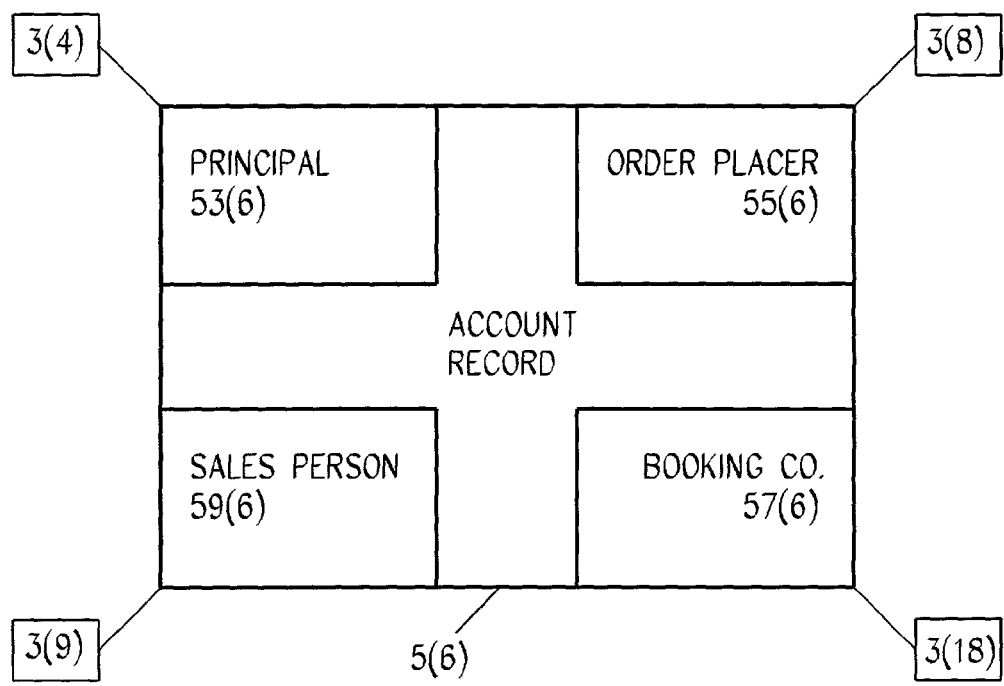
FIG. 6 is a block diagram showing the linkage between an account record and a plurality of party records in accordance with the present invention.

Referring now to FIG. 6, there is shown a block diagram that demonstrates the linkage between a particular account record and various party records. For example, account record 5(6) has a principal link field 53(6) that contains a link to a party record 3(4) in party file 3 that stores information relating to the party who is the principal associated with account 5(6). Likewise, account record 5(6) has an order placer link field 55(6), a booking company link field 57(6) and a salesperson link field 59(6) that hold links to party records 3(8), 3(18) and 3(9), respectively. These party records store information relating to the party who is the order placer, booking company and salesperson for the account.

There are numerous advantages that result from storing party information in party file 3 and then creating links between account record 5(x) and the party records 3(x) for associating the relevant parties to a particular account. First, using links to the desired party records in party file 3, the user does not have to input repeatedly party information each time that party is associated with a new account which results in significant time savings. Also, because party information is only entered in once (at the time it is entered into party file 3), data entry errors and inconsistencies that would often occur each time the same party information is reentered are eliminated. In addition, data maintenance becomes more efficient because updated party information flows to all accounts in which that party plays a role. Furthermore, because the process of associating a party to an account relies on linking to the particular party record in party file 3, the party information used for that particular party will necessarily be consistent across all accounts in which that particular party plays a role. In addition, the data architecture of the present invention simplifies the process of changing the party information because if the party information stored in party file 3 is modified, those modifications apply to all account records 5(x) that point to that particular party record. As will be shown below, because these benefits significantly improve the accuracy and consistency of the party information stored in party file 3, they will greatly increase the reliability of any data analysis, such as risk analysis and profitability analysis, that requires accurate and consistent information.

Another advantage of storing party information in the manner of the present invention is that the roles performed by the parties associated with each account are clearly defined. Referring now to FIG. 7, there is shown an account entry screen 71 according to an exemplary embodiment of the present invention. Entry screen 71 includes a plurality of entry fields corresponding to the roles performed by each party associated with the account. For example, included in entry screen 71 is a principal entry field 73 in which the principal(s) for the particular account is (are) entered. Likewise, entry screen 71 includes an order placer entry field 75, a sales person entry field 77 and a booking company entry field 79. In addition, entry screen 71 provides additional entry fields 78 for entering parties that take on other roles in the account. Because the party information is entered into specific entry fields, the role that a particular party will play in the account is clearly defined in the system. Furthermore, because the party records that are linked to a particular account record may also include party relationship and hierarchical relationship information, as explained above, the additional relationship information maintained at the party record level is incorporated into the particular account record thereby adding further definition to the roles of the parties.

Entry screen 71 includes a search parties button 72 which, when activated, presents the user with a list of parties stored in party file 3. To enter a party into an account, the user searches through this list of parties and selects the desired party. Alternatively, when search parties button 72 is activated, a search screen is provided in which the user can enter search terms. Based on the search terms, a fuzzy search of the parties is performed and matches to the search terms are provided to the user. Upon selection, the relevant party information for the selected party is retrieved from party file 3 and displayed in the appropriate entry field. Thus, party information does not have to be reentered thereby reducing input errors and improving data integrity. In addition, a "fuzzy search" capability is provided for locating a party in party file 3. By using a fuzzy search algorithm according to techniques well known in the art, once the user enters a portion of a party name, the system will present the user with a list of potentially matching parties based on phonetics and/or pattern matching.

Figure 8:
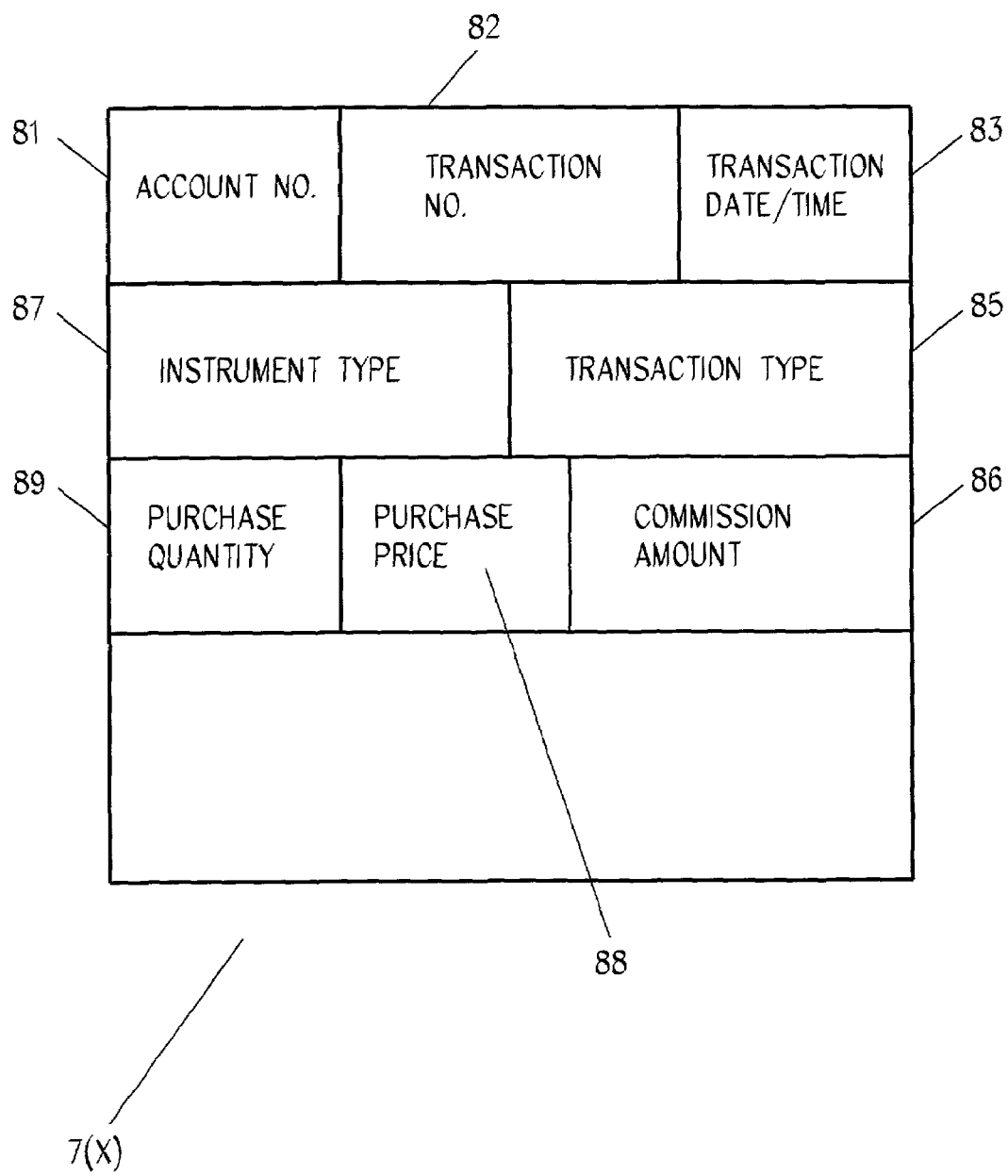
FIG. 8 is a block diagram showing the format of an transaction record of the transaction file of FIG. 1.

Referring now to FIG. 8, the format of transaction file 7 is shown. Transaction file 7 includes a plurality of records 7(1), 7(2) ... 7(N) with each record 7(x) including fields for storing information relating to a particular transaction. For example, each transaction record 7(x) of transaction file 7 may include an account number field 81, a transaction number field 82, a transaction date/time field 83, a transaction type field 85 (e.g., buy or sell), an instrument type field 87 (e.g., stock or bond), a purchase quantity field 89, a purchase price field 88 and a commission amount field 86. A person of ordinary skill in the art will recognize that, in addition to these fields, each record 7(x) may also include fields for any other information relating to a particular transaction that is desirable to maintain.

Figure 9:
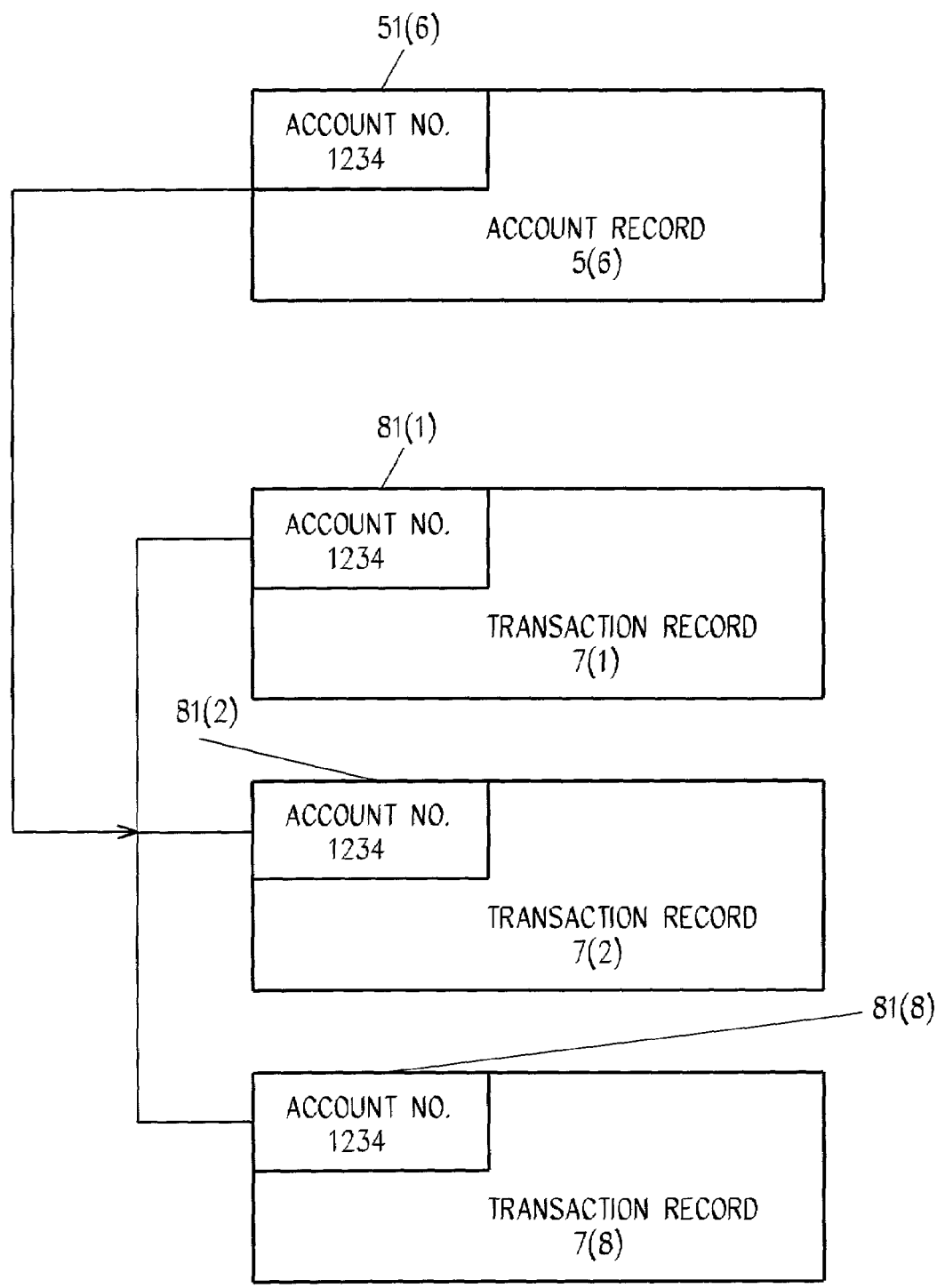
FIG. 9 is a block diagram showing the linkage between an account record and a plurality of transaction records in accordance with the present invention.

Referring now to FIG. 9, there is shown a block diagram that demonstrates the linkage between a particular account record and various transaction records associated with that particular account. As described above, each account record 5(x) has stored in account number field 51 (x) an account number that uniquely identifies the account. When a transaction is performed under a particular account, for example, account 5(6), the account number that is stored in account number field 51(6) is stored in account number fields 81(1), 81(2), and 81(8) of transaction records 7(1), 7(2) and 7(8), respectively. Thus, account record 5(6) is linked to associated transactions records 7(1), 7(2), and 7(8) via the unique account number of account number field 51(6).

Figure 10:
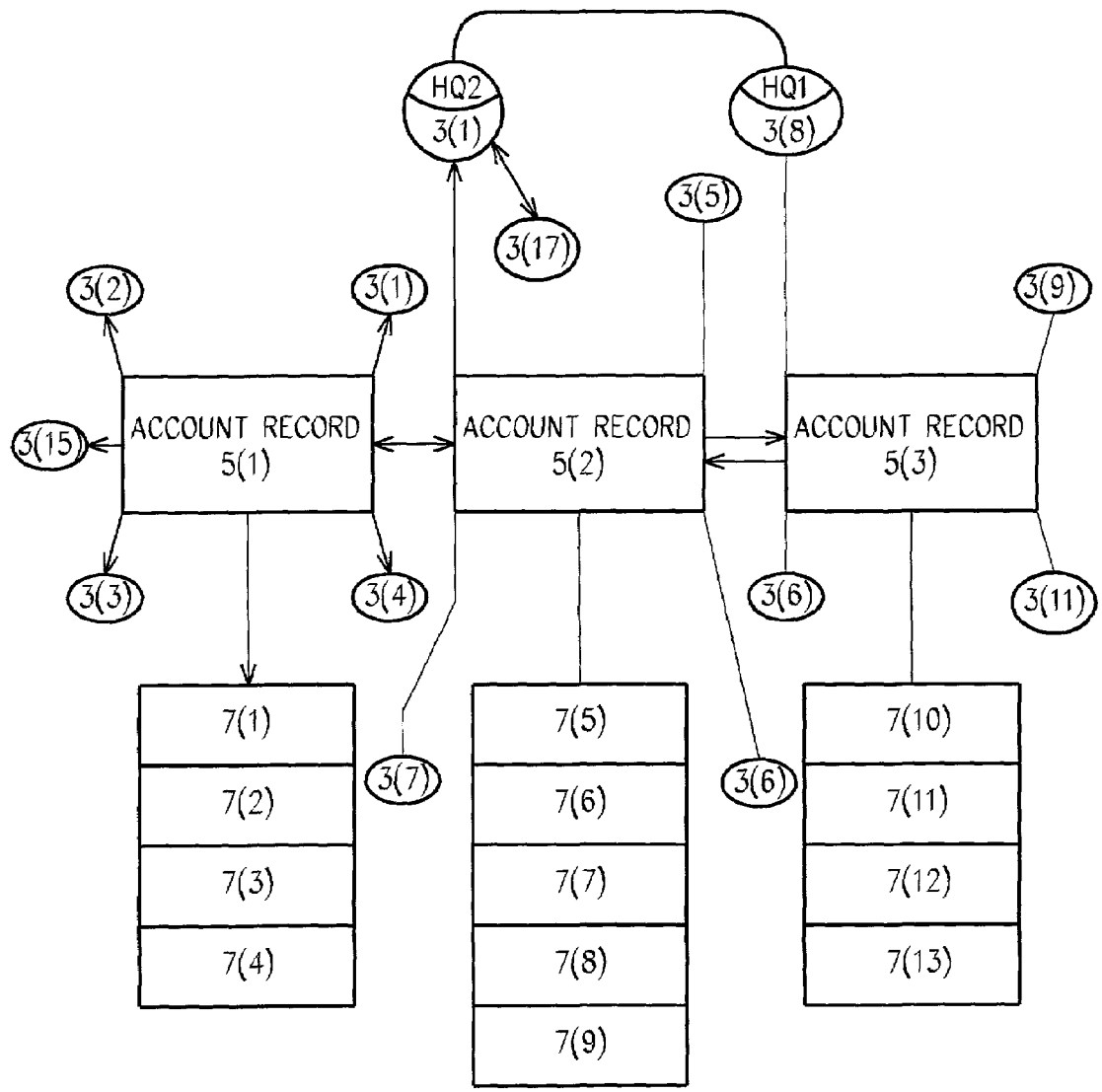
FIG. 10 is a block diagram showing the linkage between related accounts in accordance with present invention.

Referring now to FIG. 10, there is shown a block diagram depicting the linkage between related accounts in accordance with the present invention. The example in FIG. 10 includes account record 5(1) which stores the account information for a particular client account. Account record 5(1) includes links to party records 3(1), 3(2), 3(3), 3(4) and 3(15) which store the party information of the various parties associated with the particular client account. In this example, party record 3(1) stores the party information of the principal on the account, party record 3(2) the order placer, party record 3(3) the sales person, party record 3(4) the booking company and party record 3(15) the guarantor on the account. Account record 5(1) is also linked to transaction records 7(1)-7(4), each of which stores information regarding transactions executed on behalf of the principal of account record 5(1). Similarly, account record 5(2) includes links to associated party information that are stored in party records 3(1), 3(5), 3(6) and 3(7) and that represent information pertaining to the principal, order placer, salesperson and booking company, respectively. In addition, party record 3(1) is linked to party record 3(17) which indicates that a party relationship exists between the two parties. For purposes of this example, the nature of this party relationship is that of guarantor-guarantee, i.e. the party of party record 3(17) is a guarantor of all transactions performed by the party of party record 3(1) (i.e., transactions of transaction records 7(1)-7(9)—in contrast to the guarantor party of party record 3(15) which only guarantees transactions associated with the account of account record 5(1)). Account record 5(2) is also linked to transaction records 7(5)-7(9). Finally, account record 5(3) is linked to party records 3(8), 3(9), 3(6) and 3(11) which identify the principal, order placer, salesperson and booking company, respectively. Account record 5(3) is also linked to transaction records 7(10)-7(13).

In this example, the accounts of account records 5(1), 5(2) and 5(3) are related because the principals for each of these accounts are related. The principal of the accounts of account records 5(1) and 5(2) is the same—the party of party record 3(1). The principals of the accounts of account records 5(2) and 5(3), the parties of party record 3(1) and 3(8), respectively, are hierarchically related. Because these accounts are related, the transactions that are executed in both of the accounts (i.e., the transactions of transaction records 7(1)-7 (13)) are viewed together when determining the total exposure or profitability resulting from transactions performed on behalf of the principal of party record 3(1) and any related parties.

The accounts of account records 5(2) and 5(3) are also related in another way because they share a common salesperson—the party of party record 3(6). Therefore, when analyzing the profitability of transactions performed by the salesperson of party record 3(6), the transactions executed in both accounts (i.e., transactions of transaction records 7(5)-7(13)) are viewed together.

Figure 11:
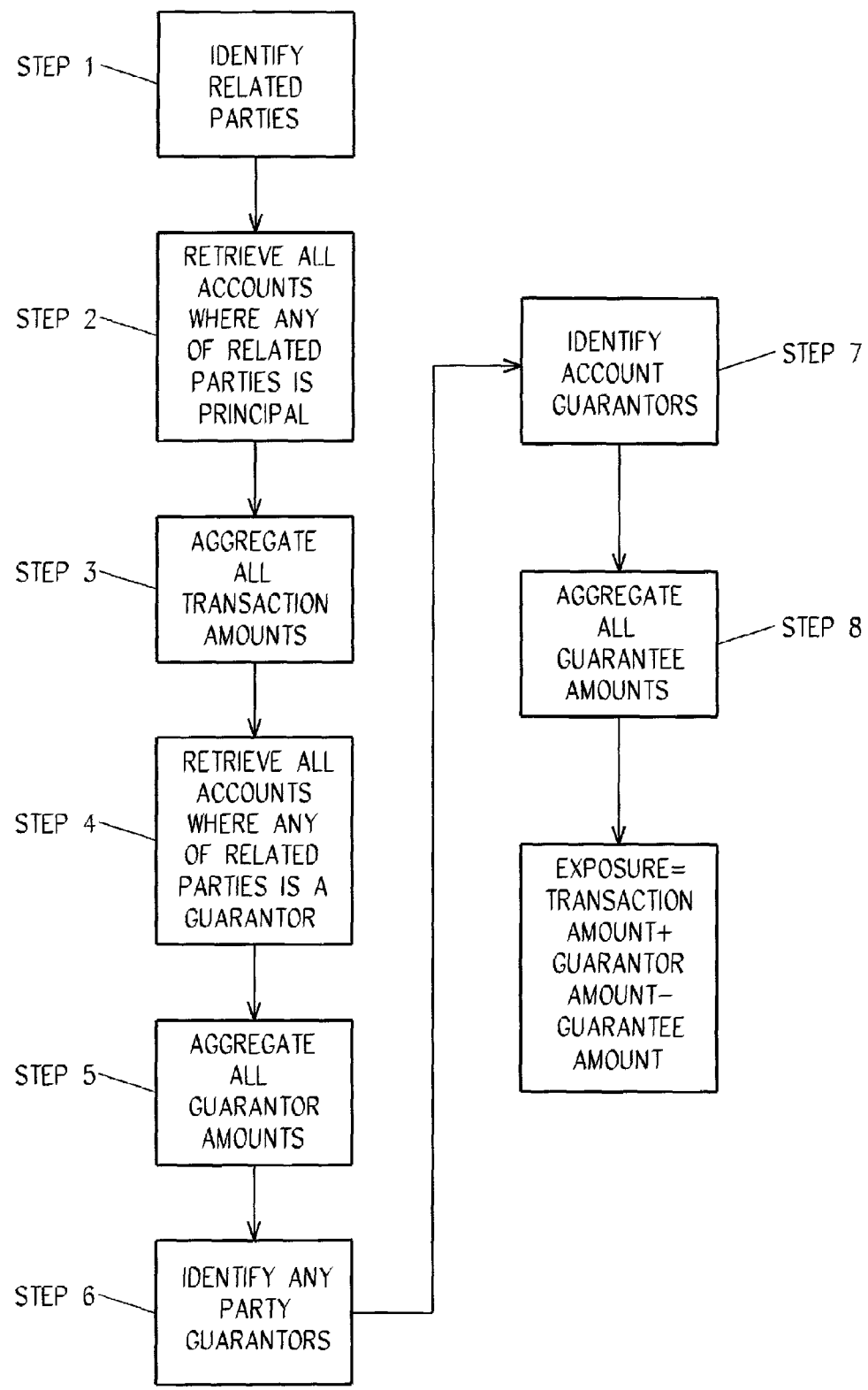
FIG. 11 is a flow diagram of the method of evaluating the risk associated with a group of transactions in accordance with the present invention.

Referring now to FIG. 11, there is shown a flowchart of the steps required to perform a risk management analysis using the account management and transaction aggregation capabilities of the system of the present invention. Assume, for the purposes of this example, that a risk analysis of all transactions executed on behalf of Party A as an account principal is desired. The first step, defined in Step 1, is to identify all of the parties that are related to Party A. The process of identifying the parties related to Party A includes examining the hierarchical relationships and party relations Party A is part of, as was previously described. Once all the parties related to Party A are identified, then, in Step 2, all accounts which have as a principal either Party A, or one of the parties related to Party A, are identified. Next, in Step 3, the transaction amounts of all of the transactions of all of the accounts identified in Step 2 are aggregated to form a total transaction amount. Next, in Step 4, all accounts which have as a guarantor either Party A, or one of the parties related to Party A, are identified. Next, in Step 5, the transaction amounts of all of the transactions of all of the accounts identified in Step 4 are aggregated to form a total guarantor amount.

Next, in Step 6, the party record of Party A, and the records of all parties related to Party A, are examined to identify any party relationships that may exist in which a party is acting as a guarantor to either Party A or any of the parties related to Party A. The guarantee amount is then determined. In Step 7, all of the accounts in which either Party A or the parties related to Party A are principals, are examined to identify any parties that are acting as guarantors at the account level. A guarantee amount is determined. Next, in Step 8, all of the guarantee amounts identified in Steps 6 and 7 are aggregated to form a total guarantee amount. Finally, in Step 9, the total risk exposure associated with Party A is determined by adding the total transaction amount to the total guarantor amount and subtracting from that sum the total guarantee amount.

The example described above illustrates how the system of the present invention is used to perform a risk analysis with respect to transactions associated with a particular principal. It will be recognized by those of ordinary skill in the art that the calculation of the risk associated with any particular party may be more complex depending upon the types of transactions under consideration as well as other factors. No matter how complicated the risk management calculations are for any particular situation, however, it is first necessary to identify the total scope of transactions that must be considered in the risk management calculations and any relevant party relationships. Using the data structures and methods of the present invention, the transactions and party relationships that bear on the risk analysis can be easily identified thereby increasing the accuracy of the risk management calculations.

Similarly, the methods described above may be used to determine the profitability of the transactions associated with a particular principal or salesperson. Also, one of ordinary skill in the art can adapt this method to perform any other analyses of the party, account and transaction information maintained by the system. For example, the system and methods of the present invention may be used to identify which financial products are being used by the clients of the financial institution for the purpose of marketing existing or new financial products to the financial institution's client base.

Thus, by using the data structures and methods of the present invention, a system is provided in which the quality of account data is greatly improved. Also, because the system tracks the roles each party plays with respect to a particular account as well as the relationships between different parties, the client account and transaction information can be easily leveraged to help manage the risks and assess the profitability of a financial institution's transactional business.

Based on the above description, it will be obvious to one of ordinary skill to implement the system and methods of the present invention in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Furthermore, alternate embodiments of the invention that implement the system in hardware, firmware or a combination of both hardware and software, as well as distributing modules and/or data in a different fashion will be apparent to those skilled in the art and are also within the scope of the invention. In addition, it will be obvious to one of ordinary skill to use a conventional database management system such as, by way of non-limiting example, Sybase, Oracle and DB2, as a platform for implementing the present invention.

It will thus be seen that the objects set forth above, among those made apparent from the preceding description, are efficiently attained. Also, certain changes may be made in carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

The invention claimed is:

1. A computer system for managing client account information comprising:
   one or more programmable processors;
   a data storage system, wherein said one or more programmable processors is operatively connected to said data storage system to receive data and instructions from said data storage system, and to transmit data and instructions to said data storage system, wherein said data storage system comprises a database management system and data architecture comprising:
      a party file having a plurality of party records, each of said plurality of party records having party data fields that store information relating to one of a plurality of parties, wherein said party data fields comprise data fields for legal name and address, and wherein each of said plurality of party records further comprises a relationship data field that enables linking to another party record to operatively enable the creation of a relationship between said parties;
      an account file having a plurality of account records, each of said plurality of account records having account data fields that store information relating to one of a plurality of accounts, wherein said account data fields comprise at least a data field for account number, and wherein each of said plurality of account records further comprises one or more role data fields that enable linking to party records to operatively associate the account to each of the linked parties with respect to the role of each of the linked parties for the account; and
      a transaction file having a plurality of transaction records, each of said plurality of transaction records having transaction data fields that store information relating to one of a plurality of transactions, wherein said transaction data fields comprise data fields for account number and transaction number, and wherein each of said plurality of transaction records is enabled to link to one of said plurality of account records whereby each transaction, performed under an account, is operatively linked to said account; and
   at least one input and output device for inputting and outputting data to/from the data storage system;
   wherein an account entry screen presents one or more role entry fields that allow selection of party data from the party file, wherein the computer system creates links between a specified account record and one or more party records, each with respect to a corresponding role, to associate one or more parties to the specified account.

2. The system of claim 1, wherein said one or more role data fields of each of said plurality of account records include at least a principal role data field that enables linking to a party record of a party that is principal for the related account.

3. The system of claim 1 or 2, wherein said one or more role data fields of each of said plurality of account records include at least an order placer role data field that enables linking to a party record of a party that is order placer for the related account.

4. The system of claim 3, wherein said one or more role data fields of each of said plurality of account records include at least booking company role data field that enables linking to a party record of a party that is booking company for the related account.

5. The system of claim 4, wherein said one or more role data fields of each of said plurality of account records include at least a salesperson role data field that enables linking to a party record that is salesperson for the related account.

6. The system of claim 3, wherein said one or more role entry fields include at least a principal entry field via which a party record stored in said party file is associated with an account as a principal, and an order placer entry field via which a party record stored in said party file is associated with an account as an order placer.

7. The system of claim 2, wherein said one or more role entry fields include at least a principal entry field via which a party record stored in said party file is associated with an account as a principal.

8. The system of claim 2, wherein said one or more role data fields of each of said plurality of account records include at least a guarantor role data field that enables linking to a party record of a party that is guarantor for the related account.

9. The system of claim 1, wherein said relationship data field comprises a party relationship data field that enables linking to another party record to operatively enables the creation of a relationship between said parties.

10. The system of claim 9, wherein the party relationship data field enables linking to another party to create a guarantor-guarantee relationship between parties.

11. The system of claim 9, wherein the party relationship data field enables linking to another party to create a company-board member relationship between parties.

12. The system of claim 1, wherein said account data fields further comprises an operative agreement data field.

13. The system of claim 1, wherein at least one of said processors is adapted to, when a client desires to enter into a new client transaction and said transaction comprises a particular set of parties having defined roles, search existing account records to determine whether said set of parties occurs in any of the existing accounts or whether the set is unique; and
    if the set is unique, to establish a new account record for that set of parties having said defined roles.

14. The system of claim 13, wherein at least one of said processors is further adapted to determine if a new operative agreement governs the transaction; and
    if a new operative agreement governs the transaction, then to establish a new account record for that set of parties and that new operative agreement.

15. The system of claim 1, wherein at least one of said processors is adapted to determine a risk exposure based on an aggregation of transaction executed on behalf of a specified party, by:
    (a) identifying, based on the party record of the specified party, related parties that are related to the specified party;
    (b) identifying all accounts that have as a principal, either the specified party or one of said related parties;
    (c) determining a total transaction amount based at least in part on the transactions of the accounts identified in step (b); and
    (d) determining the risk exposure based on the total transaction amount.

16. The system of claim 15, wherein at least one of said computer processors is further adapted to:
    (e) identify all of the accounts which have as a guarantor, the specified party or one of said related parties;
    (f) determine a total guarantor amount based on the transactions of the accounts identified in step (e);
    (g) identify any relationship among parties in which a party is acting as a guarantor to the specified party or one of the related parties;
    (h) determine a guarantee amount;
    (i) examine the accounts in which the specified party or one of the related parties are acting as guarantors at the account level; and
    (j) determine a total guarantee amount; and
    wherein the risk exposure is further based on the total guarantor amount and the total guarantee amount.

17. The system of claim 1, wherein said one or more role data fields include a principal role data field, an order placer role data field, a salesperson role data field, a booking company role data field, and said account data fields include an operating agreement data field, wherein at least one of said processors is adapted to create a new account record when a transaction occurs that has associated therewith a unique combination of principal, order placer, salesperson, booking company and operating agreement.

18. The system of claim 1, wherein said relationship data field comprises a hierarchical relationship data field, and said relationship comprises a hierarchical relationship, wherein at least one of said processors is adapted to link two party records, via said hierarchical relationship data field, to create a hierarchical relationship between said two party records, and wherein said computer system enables identification of a total scope of transactions for purposes of measuring exposure to risk by at least one of said processors being adapted to: locate all parties linked together in a specified hierarchy, retrieve all accounts in which any of the located parties are playing a selected role, and identify transactions linked to the retrieved accounts.

19. The system of claim 1, wherein said party data fields further comprise at least one of a jurisdiction of organization data field and a legal form data field.

20. The system of claim 1, wherein said transaction data fields further comprise at least one of a transaction date data field, a transaction type data field, an instrument type data field, a quantity data field and a price data field.

21. The system of claim 1, wherein said account entry screen further comprises a search parties button that when activated causes presentation, via said computer system, of a list of parties stored in the party file for user selection of a desired party.

22. The system of claim 1, wherein said account entry screen further comprises a search screen that enables the entry of search terms for, via said computer system, matching to parties stored in the party file, presentation of a list of potentially matching parties, and receiving a selection of a party from said list of potentially matching parties.

23. The system of claim 1, wherein said relationship data field comprises a hierarchical relationship data field, and said relationship comprises a parent-subsidiary relationship, wherein said hierarchical relationship data field enables linking to another party record to operatively enable the creation of a parent-subsidiary relationship between said parties.

24. The system of claim 1, wherein each of said plurality of transaction records links to one of said plurality of account records via a unique account number of said account number field.

25. A computer-implemented method for managing client account information, said computer comprising one or more programmable processors operatively connected to a data storage system, the method comprising the steps of:

using said one or more programmable processors to form a database architecture comprising:

(a) a party file having a plurality of party records, each of said plurality of party records having party data fields that store information relating to one of a plurality of parties, wherein said party data fields comprise data fields for legal name and address, and wherein each of said party records further comprises a relationship data field that enables linking to another party record to operatively enable the creation of a relationship between said parties;

(b) an account file having a plurality of account records, each of said plurality of account records having account data fields that store information relating to one of a plurality of accounts, wherein said account data fields comprise at least a data field for account number, and wherein each of said plurality of account records further comprises one or more role data fields that enable linking to party records to operatively associate the account to each of the linked parties with respect to the role of each of the linked parties for the account; and (c) a transaction file having a plurality of transaction records, each of said plurality of transaction records having transaction data fields that store information relating to one of a plurality of transactions, wherein said transaction data fields comprise data fields for account number and transaction number, and wherein each of said plurality of transaction records is enabled to link to one of said plurality of account records whereby each transaction, performed under an account, is operatively linked to said account;

presenting an account entry screen having one or more role entry fields for selection of party data from the party file; and, creating, using said one or more programmable processors, links between a specified account record and one or more party records, each with respect to a corresponding role, to associate one or more parties to the specified account.

26. The method of claim 25, wherein said one or more role data fields of each of said plurality of account records include at least a principal role data field, and further comprising the step of said one or more programmable processors linking an account record, via said principal role data field, to a party record of a party that is principal for said related account.

27. The method of claim 25 or 26, wherein said one or more role data fields of each of said plurality of account records include at least an order placer role data field, and further comprising the step of said one or more programmable processors linking an account record, via said order placer role data field, to a party record of a party that is order placer for said related account.

28. The method of claim 27, wherein said one or more role data fields of each of said plurality of account records include at least a booking company role data field, and further comprising the step of said one or more programmable processors linking an account record, via said booking company role data field, to a party record of a party that is booking company for said related account.

29. The method of claim 28, wherein said one or more role data fields of each of said plurality of account records include at least a salesperson role data field, and further comprising the step of said one or more programmable processors linking an account record, via said salesperson role data field, to a party record of a party that is salesperson for said related account.

30. The method of claim 27, wherein said one or more role entry fields include at least a principal entry field via which a party record stored in said party file is associated with an account as a principal, and an order placer entry field via which a party record stored in said party file is associated with an account as an order placer.

31. The method of claim 26, wherein said one or more role entry fields include at least a principal entry field via which a party record stored in said party file is associated with an account as a principal.

32. The method of claim 26, wherein said one or more role data fields of each of said plurality of account records include at least a guarantor role data field that enables linking to a party record of a party that is guarantor for the related account.

33. The method of claim 25, further comprising the step of at least one of said programmable processors linking each of said plurality of transaction records to one of said plurality of account records via a unique account number of said account number field.

34. The method of claim 25, wherein when a client desires to enter into a new client transaction and said transaction comprises a particular set of parties having defined roles, the method further comprises the steps of:

searching, using at least one of said programmable processors, existing account records to determine whether said set of parties occurs in any of the existing accounts or whether the set is unique; and if the set is unique, then establishing a new account record for that set of parties having said defined roles.

35. The method of claim 34, further comprising the step of:

determining, using at least one of said programmable processors, if a new operative agreement governs the transaction; and if a new operative agreement governs the transaction, then, using at least one of said programmable processors establishing a new account record for that set of parties and that new operative agreement.

36. The method of claim 25, further comprising the steps of:

(a) identifying, using at least one of said programmable processors, based on the party record of a specified party, related parties that are related to the specified party;

(b) identifying, using at least one of said programmable processors, all accounts that have as a principal, either the specified party or one of said related parties;

(c) determining, using at least one of said programmable processors, a total transaction amount based at least in part on the transactions of the accounts identified in step (b); and (d) determining, using at least one of said programmable processors, the risk exposure based on the total transaction amount.

37. The method of claim 36, further comprising the steps of:
  (e) identifying, using at least one of said programmable processors, all of the accounts which have as a guarantor, the specified party or one of said related parties;
  (f) determining, using at least one of said programmable processors, a total guarantor amount based on the transactions of the accounts identified in step (e);
  (g) identifying, using at least one of said programmable processors, any relationships among parties in which a party is acting as a guarantor to the specified party or one of the related parties;
  (h) determining, using at least one of said programmable processors, a guarantee amount;
  (i) examining, using at least one of said programmable processors, the accounts in which the specified party or one of the related parties are acting as guarantors at the account level;
  (j) determining, using at least one of said programmable processors, a total guarantee amount; and
  wherein the risk exposure is further based on the total guarantor amount and the total guarantee amount.

38. The method of claim 25, wherein said relationship data field comprises a hierarchical relationship data field, and said relationship comprises a hierarchical relationship, further comprising the step of said one or more programmable processors linking two party records, via said hierarchical relationship data field, to create a parent-subsidiary relationship between said two parties.

39. The method of claim 25, wherein the account data fields further comprise an operative agreement data field.

40. The method of claim 25, wherein said relationship data field comprises a hierarchical relationship data field, and said relationship comprises a hierarchical relationship, further comprising the step of said computer system linking two party records, via said hierarchical relationship data field, to create a hierarchical relationship between said two parties, said method further comprising the steps of: locating, using at least one of said programmable processors, all parties linked together in a specified hierarchy; retrieving, using at least one of said programmable processors, all accounts in which any of the located parties are playing a selected role; and identifying, using at least one of said programmable processors, transactions linked to the retrieved accounts.

41. The method of claim 25, wherein said party data fields further comprise at least one of a jurisdiction of organization data field and a legal form data field.

42. The method of claim 25, wherein said transaction data fields further comprise at least one of a transaction date data field, a transaction type data field, an instrument type data field, a quantity data field and a price data field.

43. The method of claim 25, further comprising the steps of:
  providing, using at least one of said programmable processors, a search parties button in said account entry screen for selection of party data from the party file; and
  presenting, using at least one of said programmable processors, upon activation of said search parties button, a list of parties stored in said party file.

44. The method of claim 25, further comprising the steps of:
  providing, using at least one of said programmable processors, a search parties button in said account entry screen for selection of party data from the party file;
  presenting, using at least one of said programmable processors, upon activation of said search parties button, a search screen in which search terms can be entered;
  performing, using at least one of said programmable processors, based on said search terms, a fuzzy search of parties stored in said party file; and
  providing, using said computer system, matches to said search terms.

45. The method of claim 25, wherein said presenting step comprises using an input and output device for data input and output to or from said data storage system.

46. The method of claim 25, wherein said relationship data field comprises a party relationship data field, said method further comprising the step of at least one of said programmable processors linking a party record, via said party relationship data field, to another party record to operatively enable the creation of a relationship between said parties.

47. The method of claim 46, further comprising the step of said one or more programmable processors linking two party records, via said party relationship data field, to create a guarantor-guarantee relationship between said two parties.

48. The method of claim 46, further comprising the step of said computer system linking two party records, via said party relationship data field, to create a company-board member relationship between said two parties.

49. The method of claim 25, wherein said one or more role data fields include a principal role data field, an order placer role data field, a salesperson role data field, a booking company role data field, and said account data fields include an operating agreement data field, and said method further comprising creating, with at least one of said programmable processors, a new account record when a transaction occurs that has associated therewith a unique combination of principal, order placer, salesperson, booking company and operating agreement.

* * * * *